Sept. 11, 1928.
F. F. FORSHEE
1,684,176
WAFFLE IRON HEATING ELEMENT
Filed Oct. 10, 1925
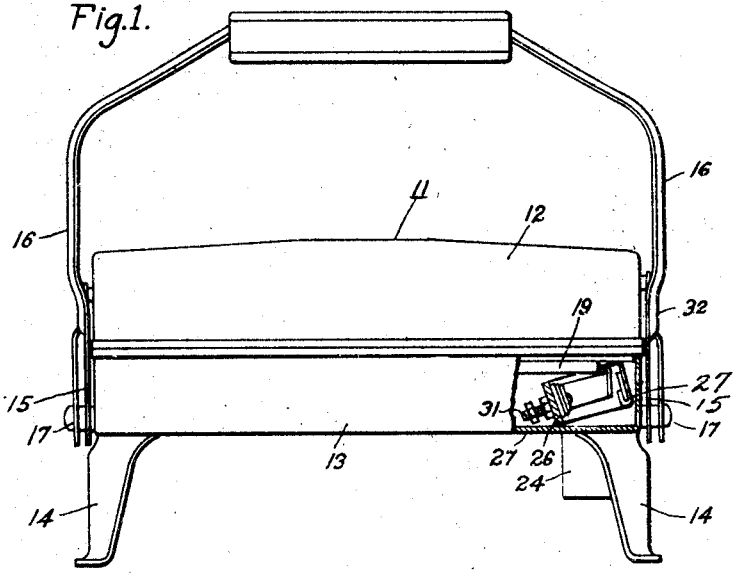
Fig.1.
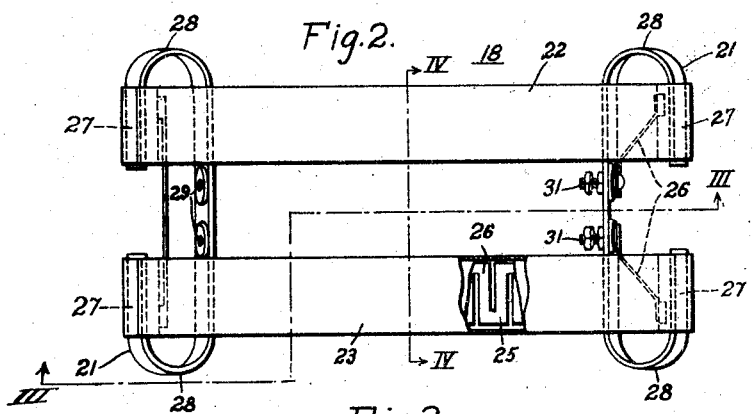
Fig.2.
Fig.3.
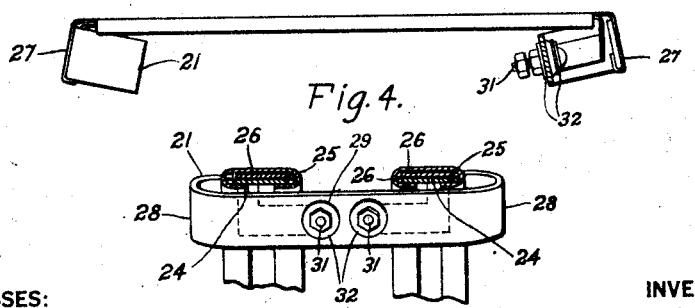
Fig.4.
WITNESSES:
C. J. Weller.
G. B. Tjoflat
INVENTOR
Frank F. Forshee.
BY
Wesley G. Carr
ATTORNEY Patented Sept. 11, 1928.

1,684,176

UNITED STATES PATENT OFFICE.

FRANK F. FORSHEE, OF MANSFIELD, OHIO, ASSIGNOR TO WESTINGHOUSE ELECTRIC & MANUFACTURING COMPANY, A CORPORATION OF PENNSYLVANIA.

WAFFLE-IRON HEATING ELEMENT.

Application filed October 10, 1925. Serial No. 61,696.

My invention relates to electric heating devices and particularly to heating elements for such devices.

An object of my invention is to provide a heating unit that shall have good thermal engagement with the surface to be heated.

Another object of my invention is to provide a heating element that shall have high thermal conductivity and shall be simple in construction, economical and easily manufactured.

Another object of my invention is to provide a heating unit that shall have means for exerting pressure on the surface to be heated, thereby increasing the efficiency of the heating unit, and thus compensate for any reasonable irregularities in the dimensions of the containers in which the heating unit is located.

Heretofore, it has been found necessary to pack heat-resistant material, such as asbestos, or mineral wool, against the heating unit in order to hold it firmly against the surface to be heated. By means of my invention, I have successfully produced a device that shall exert pressure against the surface to be heated by reason of the resilient supports attached to the ends of the heating unit, thereby eliminating the necessity for using such heat-resistant materials.

In the accompanying drawings,

Figure 1 is a view of an electric waffle iron, partially in section, showing the relative position of the heating unit and the surface to be heated, Fig. 2 is a view, partially in plan and partially in section, of the heating unit embodying my invention, Fig. 3 is a view, partially in section, taken along the line III—III of the heating unit illustrated in Fig. 2, and Fig. 4 is a sectional view taken along the line IV—IV of Fig. 2.

Referring more particularly to Fig. 1, a waffle iron structure 11 comprises two containers 12 and 13 supported by legs 14. Levers 15 and 16, supported on the pivots 17 serve as means for moving the containers 12 and 13 relatively to each other. A heating unit 18 is disposed in each of the containers and its surface is held in intimate contact with the baking members 19.

In Fig. 2, I have shown more clearly the combined construction of the heating unit 18 and a supporting means 21 therefor. The heating unit 18 comprises two sheath members 22 and 23 with metal gibs 24 located therein, enclosing a resistor 25. The resistor 25 is insulated from the sheath members 22 and 23 and the gibs 24 by insulating material 26, such as mica. The two sheaths 22 and 23 have extending portions 27, that are bent in the form shown in Fig. 3, so as to be resilient. The supports 21 are of substantially C-shape and are joined to the laterally-extending portions 27 by clamping the lower edge of the portion 27 around the ends of the supports 21 The supports 21 may be made to join more firmly with the laterally-extending portions 27 by spot welding them in addition to bending the lower edge of the portion 27 around the supports.

In placing the heating units in the containers 12 and 13, the supports 21 are bent inwardly and underneath the sheath members 22 and 23 and subsequently placed in said containers. The baking members 19, of which one only is shown, are then pressed down onto the sheaths 22 and 23 and fastened by means of screws (not shown) to the casings 12 and 13. By reason of the resiliency of the portions 27, a pressure is exerted against the baking members 19 and the degree of the pressure exerted depends upon the deflection inwardly of the portions 27.

The bent extremities 28 of the supports 21 fit firmly against the sides of the container and, since the opening in the C section of the supporting members 21 may be varied, any reasonable irregularities in the size of the containers may be compensated for, and the pressure exerted on the sides of the containers will be sufficient to maintain the heating units 18 in their operative positions.

The supports 21 are provided with holes 29, as shown in Figs. 2 and 4, to receive terminals 31, whereby the resistors 25 may be connected to an electric circuit. The terminals 31 are insulated from the supports 21 by mica washers 32. The supports 21 attached to the laterally extending portions 27 of the sheathed members 22 and 23, do not lie parallel with the sheath members 13 because of the resiliency of the portions 27 so that the pressure required to produce the thermal conductivity into the baking surfaces will be supplied by the heating unit 18 in combination with the aforesaid members 21 and the resilient portions 27.

Various other modifications and applications of my heating unit may be made without departing from the spirit and scope of my invention. I desire, therefore, that only such limitations shall be placed thereon as shall be imposed by the prior art.

I claim as my invention:

1. In combination, an electric heating unit comprising a plurality of elongated, encased heating elements, resilient laterally-extending portions at the ends thereof, and a pair of resilient supports joined to said resilient portions.

2. In combination, an electric heating unit comprising a plurality of sheathed heating elements having integral laterally-extending, resilient portions at the ends thereof, and a supporting means, of substantially C-shape, joined to said laterally-extending resilient portions and extending inwardly therefrom.

3. In a cooking device, the combination with a container and a baking member associated therewith, of a heating unit comprising a plurality of thermally conductive sheathed resistor elements therein, and embodying resilient means for maintaining the thermally conductive sheaths in proper operative relation to said baking member.

4. In a cooking device, the combination with a container and a baking member associated therewith, of a heating unit located in the container and comprising a plurality of thermally-conductive sheathed members having resilient laterally-extending end portions, and resilient supporting members secured thereto and effective to maintain the heating means in intimate contact with, and in proper operative relation to, said baking member.

5. In an electric appliance, the combination with a container and a baking member associated therewith, of a heating unit comprising a pair of sheathed resistors which are electrically insulated therefrom, having laterally-extending resilient end portions, a pair of resilient supporting members, of substantially C-shape, secured to said resilient end portions, and terminals for the heating means mounted on, and insulated from, one of the supporting members.

6. In an electric appliance, the combination with a container and a baking member associated therewith, of a heating unit located in said container and comprising a plurality of resistor members, elongated supports for the resistor members having laterally-extending integral end portions, and resilient supporting members secured to the end portions for holding the heating unit in close operative engagement with said baking member.

7. In combination, an electric heating unit comprising a plurality of resistor members, supports therefor having resilient end portions, and a resilient member extending laterally of said supports and joined to said resilient end portions.

In testimony whereof, I have hereunto subscribed my name this 29th day of Sept., 1925.

FRANK F. FORSHEE.